(12) United States Patent
Smith (10) Patent No.: US 11,952,169 B2
(45) Date of Patent: *Apr. 9, 2024

(54) COLLAPSIBLE STORAGE CONTAINER (71) Applicant: Stephen A. Smith, Sacramento, CA (US)

(72) Inventor: Stephen A. Smith, Sacramento, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/311,969

(22) Filed: May 4, 2023

(65) Prior Publication Data

US 2023/0271753 A1 Aug. 31, 2023

Related U.S. Application Data (63) Continuation of application No. 17/369,038, filed on Jul. 7, 2021, now Pat. No. 11,643,249.

(51) Int. Cl.
B65D 21/08 (2006.01)
A47J 47/12 (2006.01)
B65D 8/00 (2006.01)
B65D 81/20 (2006.01)
B65D 85/36 (2006.01)

(52) U.S. Cl.
CPC ............ B65D 21/086 (2013.01); A47J 47/12 (2013.01); B65D 11/02 (2013.01); B65D 81/20 (2013.01); B65D 85/36 (2013.01); B65D 2205/00 (2013.01)

(58) Field of Classification Search
CPC ...... B65D 21/086; B65D 11/02; B65D 85/36; A47J 147/12
See application file for complete search history.

(56) References Cited

U.S. PATENT DOCUMENTS

| | | | |
|---|---|---|---|
| 1,252,775 A | | 1/1918 | Butcher |
| 2,416,142 A | * | 2/1947 | Bennett ............ B65D 3/04 138/140 |
| 3,819,040 A | * | 6/1974 | Coons ............ B65D 41/0442 206/315.9 |
| 5,605,242 A | | 2/1997 | Hwang |
| 6,116,448 A | | 9/2000 | Fragos |
| 6,290,059 B1 | | 9/2001 | Chuan |
| 6,637,645 B2 | | 10/2003 | Ferguson |
| 8,342,750 B2 | | 1/2013 | Heinlen et al. |
| 9,033,172 B2 | | 5/2015 | Thati |
| 9,585,521 B2 | | 3/2017 | Bagley |
| 10,611,521 B1 | | 4/2020 | Piernot et al. |
| 2006/0263494 A1 | | 11/2006 | Geng et al. |
| 2008/0000902 A1 | | 1/2008 | Holbrook et al. |
| 2014/0183189 A1 | | 7/2014 | Hotell |

(Continued)

OTHER PUBLICATIONS

International Searching Authority, International Search Report in re Int'l Appl. No. PCT/US22/73194, dated Nov. 1, 2022.

(Continued)

Primary Examiner — Don M Anderson
(74) Attorney, Agent, or Firm — Synergy Patent Group, LLC (57) ABSTRACT Various aspects of the disclosure generally relate to a collapsible storage container with multiple sleeves. In some implementations a two-sleeve variant is described. In some implementations a three-sleeve variant is described. Both variants may be used to contain appropriately sized and shaped objects, for example bread, maps, posters, blueprints, plans, etc.

17 Claims, 4 Drawing Sheets

(56) References Cited

U.S. PATENT DOCUMENTS

| | | |
|---|---|---|
| 2016/0114237 A1 | 4/2016 | Garcia, Jr. |
| 2020/0223603 A1 | 7/2020 | Ames |
| 2020/0239188 A1 | 7/2020 | Curcio |
| 2020/0299026 A1 | 9/2020 | Gardner |

OTHER PUBLICATIONS

International Searching Authority, Written Opinion of the International Searching Authority in re Int'l Appl. No. PCT/US22/73194, dated Nov. 1, 2022.

\* cited by examiner

COLLAPSIBLE STORAGE CONTAINER

CROSS-REFERENCE TO RELATED APPLICATIONS

This application is a continuation that claims priority under 35 U.S.C. § 120 to U.S. patent application Ser. No. 17/369,038, filed Jul. 7, 2021 and hereby incorporated by reference in its entirety.

BACKGROUND

Field of the Disclosure

The disclosure relates to containers for storing cylinder-like objects, for example bread or other similarly shaped consumables, plans, maps, posters, and so on.

Description of Related Art

Storage containers exist for bread in a variety of forms, most conforming to the standard size and shape of loaf sold in stores and pre-sliced. Other means for storing bread include plastic wrap or aluminum foil, but achieving a good seal and preventing the bread from drying out can be a challenge. Re-wrapping the bread over and over with foil or plastic is also not very effective.

Bags are available and provide some delay to bread drying out, but are not a perfect solution for all bread.

SUMMARY

A collapsible storage container is described with a second sleeve having a wall, a first end and a second end. The wall of the second sleeve encloses a space within the second sleeve and has a length greater than its depth. The first end of the second sleeve is open to enable free access to the space within the second sleeve. The second end of the second sleeve is closed to inhibit access to the space within the second sleeve. There is a third sleeve having a wall, a first end and a second end. The wall of the third sleeve encloses a space within the third sleeve and has a length greater than its depth. The first end of the third sleeve is open to enable free access to the space within the third sleeve. The second end of the third sleeve is closed to inhibit access to the space within the third sleeve. The depth of the third sleeve may be less than the depth of the second sleeve such that the third sleeve engagedly fits within the second sleeve.

In another implementation, a collapsible storage container is described with a first sleeve having a wall, a first end and a second end. The wall of the first sleeve encloses a space within the first sleeve and has a length greater than its depth. The first and second ends of the first sleeve are open to enable free access to the space within the first sleeve. A second sleeve has a wall, a first end and a second end. The wall of the second sleeve encloses a space within the second sleeve and has a length greater than its depth. The first end of the second sleeve is open to enable free access to the space within the second sleeve. The second end of the second sleeve is closed to inhibit access to the space within the second sleeve. The depth of the second sleeve is more than the depth of the first sleeve such that the first sleeve engagedly fits within the second sleeve. A third sleeve has a wall, a first end and a second end. The wall of the third sleeve encloses a space within the third sleeve and has a length greater than its depth. The first end of the third sleeve is open to enable free access to the space within the third sleeve. The second end of the third sleeve is closed to inhibit access to the space within the third sleeve. The depth of the third sleeve is less than the depth of the first sleeve such that the third sleeve engagedly fits within the first sleeve.

The foregoing has outlined rather broadly the gestures and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of this disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully herein with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure may be embodied by one or more elements of a claim.

Figure 1:
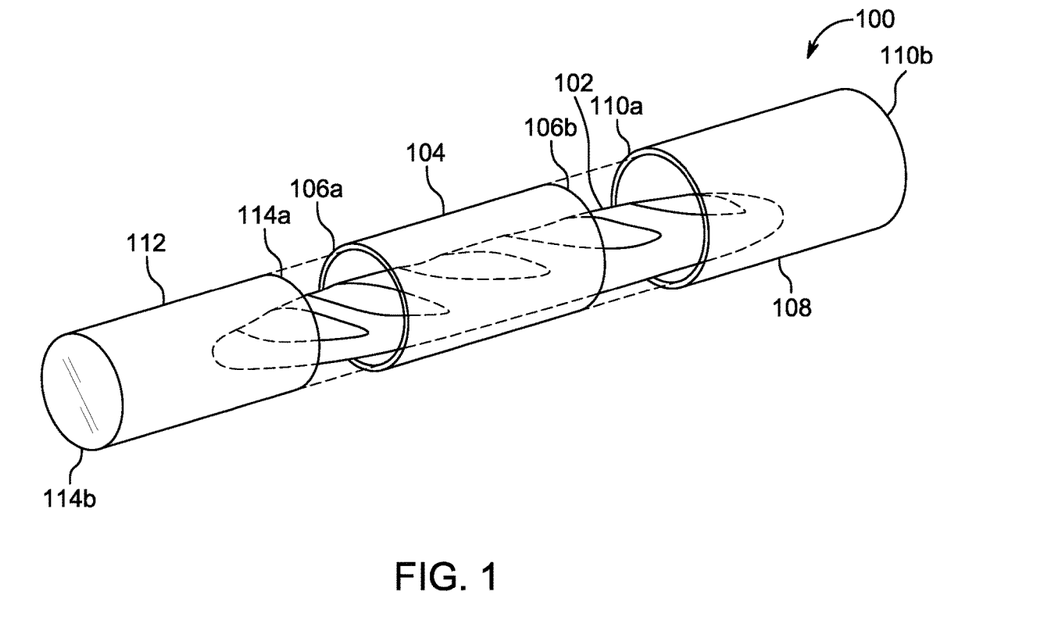
FIG. 1 is a top left perspective view illustrating an expanded storage container enclosing a piece of bread.

FIG. 1 illustrates bread preserver 100 containing bread 102 inside. Bread preserver 100 includes three sleeves. Sleeve 104 in the center is cylindrical, enclosing the middle of bread 102 (illustrated with dotted lines inside sleeve 104), with ends 106a and 106b both open. Sleeve 108 is positioned on a side of bread preserver 100 and is larger in diameter than sleeve 104. Sleeve 108 is cylindrical, enclosing an end of bread 102 (illustrated with dotted lines inside sleeve 108), and has ends 110a and 110b. End 110a is open and able to receive bread 102 as well as sleeve 104. End 110b is closed, for example with a flat, non-removable cap (which may be similar to end 114b, see below). Sleeve 112 is positioned on a side of bread preserver 100 opposite to sleeve 108. Sleeve 112 is smaller in diameter than sleeve 104. Sleeve 112 is cylindrical, enclosing an end of bread 102 (illustrated with dotted lines inside sleeve 112), and has ends 114a and 114b. End 114a is open and able to receive bread 102. End 114b is closed, for example with a flat, non-removable cap (which may be similar to end 110b).

In one implementation, bread preserver 100 is sized to accommodate a French baguette. A baguette could have a diameter of approximately 2.4 inches with a length of 25 to 39 inches. Narrower and wider loaves of bread should be considered as part of the disclosure, as well as longer and shorter loaves. One characteristic of baguettes is they are longer than they are wide, in a roughly 10:1 ratio of length to diameter, or even greater than 10:1, for example 11:1, 12:1, 13:1, 14:1, 15:1 and 16:1. Bread preserver 100 has an overall length that accommodates baguettes prepared to local customs. Although whole ratios are listed, it should be understood that any partial ratio within the range of baguettes is also part of the disclosure (e.g. 13.5:1, 11.05:1, 14.27:1, etc.). In one implementation sleeves 104, 108 and 112 are similar in length. In one implementation sleeves 104, 108 and 112 have different lengths from one another. In one implementation sleeves 108 and 112 are a similar length to one another but a different length from sleeve 104. For example, in order to contain a baguette 36" in length, the overall length of bread preserver 100 is at least 36". "Overall length" as used herein means that sleeve 112 is inside sleeve 104 some minimal distance and sleeve 104 is inside sleeve 108 some minimal distance, and with these minimal insertions bread preserver 100 has an overall length that is less than the sum of lengths for each individual sleeve. With an overall length of at least 36", if each of sleeves 104, 108 and 112 are a similar length, then they are each greater than 12" in length. For example, they may each have a length of 13", or 14", or 12.5", or 14.3", and so on. One of ordinary skill in the art will recognize that baguettes come in a variety of lengths and some variation in width, but conform within a range that is accepted for a given region or culture. For example, a baguette that is 90" is not normally available. For example, bread preserver 100 made for a bread stick may be 1" in depth with an overall length of 12".

When bread 102 is new (or whole, i.e. uneaten) then bread preserver 100 is in a relatively expanded state when containing bread 102. Sleeve 104 may be inserted a minimal distance into sleeve 108, and sleeve 112 may be inserted a minimal distance into sleeve 104. An end of bread 102 will be near or touching end 110b and the opposite end of bread 102 will be near or touching end 114b. Bread 102 will be contained in bread preserver 100 and have protection from the ambient environment. In the case that bread preserver 100 has an overall length greater than bread 102, it is optional to collapse bread preserver 100 until the ends of bread 102 are near or touching ends 110b and 114b. Doing so decreases exposure of bread 102 to air. As bread 102 is consumed it shortens, and bread preserver 100 may be shortened in overall length. Bread preserver 102 is shortened when end 106b of sleeve 104 is inserted further past end 110a of sleeve 108. Alternatively, or in conjunction with this, end 114a of sleeve 104 may be inserted further past end 106a of sleeve 104.

The diameter difference between sleeve 104 and sleeve 108 may be enough for friction to provide engagement between the sleeves. In one implementation, there is enough friction between sleeves 104 and 108 to inhibit the free passage of air between them. In one implementation, there is enough friction between sleeves 104 and 108 to prevent, with sleeve 104 at least one third of the way into sleeve 108, sleeves 104 and 108 from separating due solely to gravity. In one implementation, a similar fit exists between sleeves 104 and 112, as between sleeve 104 and 108. In one implementation, the fit between sleeves 104 and 112 is different from the fit between sleeves 104 and 108.

FIG. 1 illustrates a three-sleeve implementation. It is within the scope of this disclosure to include a two-sleeve implementation, for example without sleeve 104. In one implementation, sleeve 112 is smaller in diameter than sleeve 108 and fits within sleeve 108 in a manner to restrict the free flow of air from the inside of the joined sleeves to the outside. The sizing and manufacture of bread preserver 100 may be such to allow for sleeve 104 as an optional piece of bread preserver 100. In another implementation, a bread preserver has no middle sleeve, with only the end sleeves pairing with one another (for example, with respect to FIG. 1, sleeves 108 and 112). FIG. 1 illustrates bread 102 within bread preserver 100, however it should be understood that any appropriately shaped object can be stored in the container, for example maps, posters, plans, blueprints, pictures, etc. Additionally, a collapsible container sized for objects other than bread will have different dimensions than one sized for bread. The length may be more or less, and the depth may be more or less.

Figure 2:
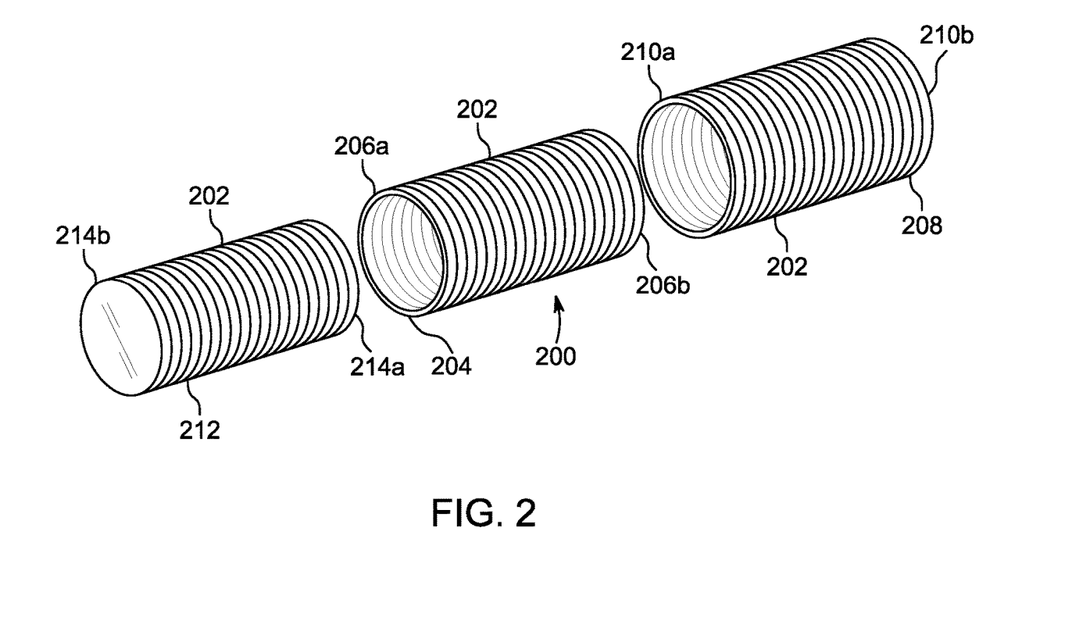
FIG. 2 is a top left perspective view illustrating an expanded storage container having concentric ridges.

FIG. 2 illustrates bread preserver 200 with concentric ridges 202. Bread preserver 200 includes three sleeves. Sleeve 204 in the center is cylindrical with ends 206a and 206b both open. Sleeve 208 is positioned on a side of bread preserver 200 and is larger in diameter than sleeve 204. Sleeve 208 is cylindrical and has ends 210a and 210b. End 210a is open and able to receive bread (not illustrated) as well as sleeve 204. End 210b is closed, for example with a flat, non-removable cap (which may be similar to end 214b, see below). Sleeve 212 is positioned on a side of bread preserver 200 opposite to sleeve 208. Sleeve 212 is smaller in diameter than sleeve 204. Sleeve 212 is cylindrical, enclosing an end of a loaf or baguette (not illustrated), and has ends 214a and 214b. End 214a is open. End 214b is closed, for example with a flat, non-removable cap or cover (which may be similar to end 210b). Sleeve 204 is narrower in diameter than sleeve 208. Sleeve 212 is narrower in diameter than sleeve 204. Sleeves 304, 308 and 312 may have similar lengths, or their lengths may differ.

Concentric ridges 202 on sleeves 204, 208 and 212 may have a sinusoidal or other repeating pattern such that as sleeve 204 is inserted into sleeve 208, ridges 202 on sleeve 204 engage with ridges 202 on sleeve 208. The amplitude of concentric ridges 202 provides a close-enough fit between sleeves 204 and 208, or between sleeves 212 and 204, in order to substantially inhibit the passage of air from within bread preserver 200 to the outside, while at the same time allowing for a fit between the sleeves with an amount of force not resulting in permanent deformation or damage to bread preserver 200. In one implementation bread preserver 200 is manufactured from a plastic that allows for minor deformation while the sleeves are engaged with respect to one another, for example polyethylene.

One of skill in the art will recognize that although ridges 202 are illustrated in FIG. 2 as completely encircling each of sleeves 204, 208 and 212, fractional enclosures are also possible. For example, there may be a varying pattern such that a specific orientation between sleeves 204, 208 and 212 is needed in order to facilitate a fit between them. Along one segment of a sleeve there is one pattern, and on the opposite side there is another pattern, both patterns running along the entire length of a sleeve. In another implementation, concentric ridges may encircle less than an entire sleeve with the remainder being, for example, smooth. Concentric ridges may also be present along the full length of the sleeves, or along a partial length and not along the entire length. For example, sleeve 204 may have a pattern of ridges along the entire length, while sleeves 208 and 212 have a matching pattern along less than their entire length. In another implementation, a fractional enclosure of a sleeve with a pattern may be present along less than the entire length of the sleeve.

FIG. 2 illustrates a three-sleeve implementation. It is within the scope of this disclosure to include a two-sleeve implementation, for example without sleeve 204. In one implementation, sleeve 212 is smaller in diameter than sleeve 208 and fits within sleeve 208 in a manner to restrict the free flow of air from the inside of the joined sleeves to the outside. The sizing and manufacture of bread preserver 200 may be such to allow for sleeve 204 as an optional piece of bread preserver 200. In another implementation, a bread preserver has no middle sleeve, with only the end sleeves pairing with one another (for example, with respect to FIG. 2, sleeves 208 and 212). FIG. 2 refers to bread preserver 200, however it should be understood that any appropriately shaped object can be stored in the container, for example maps, posters, plans, blueprints, pictures, etc. Additionally, a collapsible container sized for objects other than bread will have different dimensions than one sized for bread. The length may be more or less, and the depth may be more or less.

Figure 3:
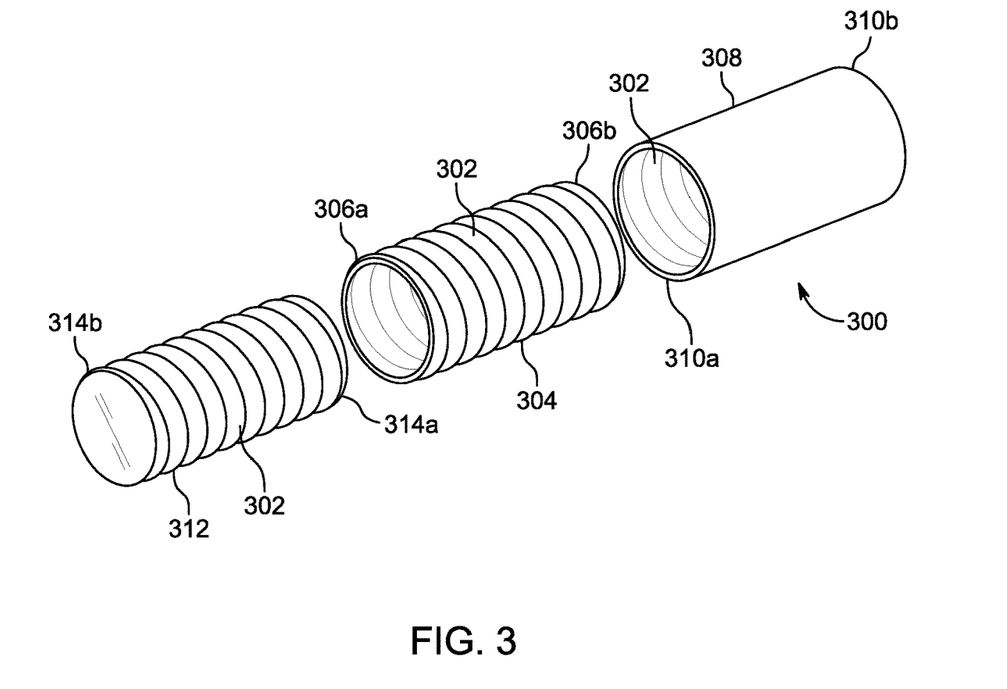
FIG. 3 is a top left perspective view illustrating an expanded storage container having a thread pattern.

FIG. 3 illustrates bread preserver 300 having thread pattern 302. Bread preserver 300 includes three sleeves. Sleeve 304 in the center is cylindrical with ends 306a and 306b both open. Sleeve 308 is positioned on a side of bread preserver 300 and is larger in diameter than sleeve 304. Sleeve 308 is cylindrical and has ends 310a and 310b. End 310a is open and able to receive bread (not illustrated) as well as sleeve 304. End 310b is closed, for example with a flat, non-removable cap (which may be similar to end 314b, see below). Sleeve 312 is positioned on a side of bread preserver 300 opposite to sleeve 308. Sleeve 312 is smaller in diameter than sleeve 304. Sleeve 312 is cylindrical, enclosing an end of a loaf or baguette (not illustrated), and has ends 314a and 314b. End 314a is open. End 314b is closed, for example with a flat, non-removable cap or cover (which may be similar to end 310b). Sleeve 304 is narrower in diameter than sleeve 308. Sleeve 312 is narrower in diameter than sleeve 304. Sleeves 304, 308 and 312 may have similar lengths, or their lengths may differ.

Thread pattern 302 may be any pattern, for example course or fine and in any pitch, and in either a right or left-handed thread. Inserting, for example, sleeve 304 into sleeve 308 would involve aligning thread pattern 302 of sleeve 304 with thread pattern 302 of sleeve 308, similar to how the thread pattern of a bolt aligns to the thread pattern of a nut. Once aligned, sleeves 304 and 308 are rotated with respect to one another and in accordance with their pattern, so that sleeve 304 rotatably engages with sleeve 308 and end 306b of sleeve 304 approaches end 310b of sleeve 308. In one implementation a similar rotating engagement may occur between sleeve 312 and 304. In one implementation, bread preserver 300 resists deformation and is manufactured from a harder material than bread preserver 200 of FIG. 2. For example, bread preserver 300 may be made from acrylic.

FIG. 3 illustrates a three-sleeve implementation. It is within the scope of this disclosure to include a two-sleeve implementation, for example without sleeve 304. In one implementation, sleeve 312 is smaller in diameter than sleeve 308 and fits within sleeve 308 in a manner to restrict the free flow of air from the inside of the joined sleeves to the outside. The sizing and manufacture of bread preserver 300 may be such to allow for sleeve 304 as an optional piece of bread preserver 300. In another implementation, a bread preserver has no middle sleeve, with only the end sleeves pairing with one another (for example, with respect to FIG. 3, sleeves 308 and 312). FIG. 3 refers to bread preserver 300, however it should be understood that any appropriately shaped object can be stored in the container, for example maps, posters, plans, blueprints, pictures, etc. Additionally, a collapsible container sized for objects other than bread will have different dimensions than one sized for bread. The length may be more or less, and the depth may be more or less.

Figure 4:
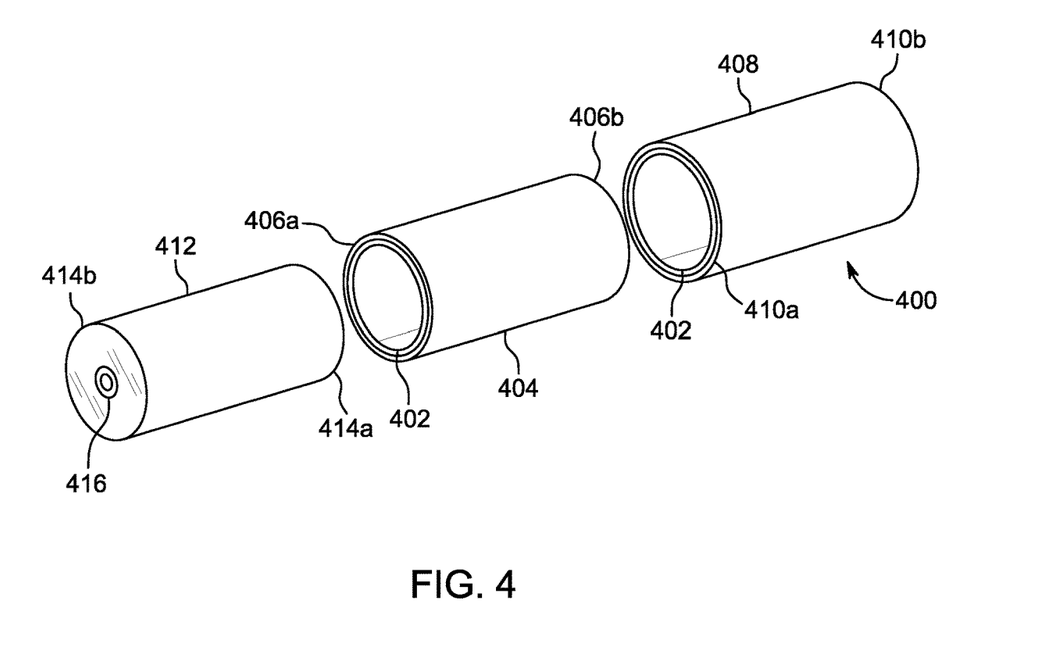
FIG. 4 is a top left perspective view illustrating an expanded storage container having gaskets.

FIG. 4 illustrates bread preserver 400 having gaskets 402. Bread preserver 400 includes three sleeves. Sleeve 404 in the center is cylindrical with ends 406a and 406b both open. Sleeve 408 is positioned on a side of bread preserver 400 and is larger in diameter than sleeve 404. Sleeve 408 is cylindrical and has ends 410a and 410b. End 410a is open and able to receive bread (not illustrated) as well as sleeve 404. End 410b is closed, for example with a flat, non-removable cap (which may be similar to end 414b, see below). Sleeve 412 is positioned on a side of bread preserver 400 opposite to sleeve 408. Sleeve 412 is smaller in diameter than sleeve 404. Sleeve 412 is cylindrical, enclosing an end of a loaf or baguette (not illustrated), and has ends 414a and 414b. End 414a is open. End 414b is closed, for example with a flat, non-removable cap or cover (which may be similar to end 410b). Sleeve 404 is narrower in diameter than sleeve 408. Sleeve 412 is narrower in diameter than sleeve 404. Sleeves 404, 408 and 412 may have similar lengths, or their lengths may differ.

In one implementation gasket 402 of sleeve 408 provides a seal between sleeves 404 and 408. In one implementation gasket 402 of sleeve 412 provides a seal between sleeves 412 and 404. In one implementation, gaskets 402 substantially inhibit the passage of air between the sleeves, but not entirely. Collapsing bread preserver 400 in this implementation would force air out of bread preserver 400 and through space between gaskets 402 and either or both of sleeves 404 and 412.

In one implementation, gaskets 402 substantially inhibit the passage of air between the sleeves such that valve 416 is engaged. Collapsing bread preserver 400 in this implementation forces air out of bread preserver 400 and through valve 416. Expanding bread preserver 400 draws air in through valve 416. In one implementation the gaskets are made from a rubber or plastic.

FIG. 4 illustrates a three-sleeve implementation. It is within the scope of this disclosure to include a two-sleeve implementation, for example without sleeve 404. In one implementation, sleeve 412 is smaller in diameter than sleeve 408 and fits within sleeve 408 in a manner to restrict the free flow of air from the inside of the joined sleeves to the outside. The sizing and manufacture of bread preserver 400 may be such to allow for sleeve 404 as an optional piece of bread preserver 400. In another implementation, a bread preserver has no middle sleeve, with only the end sleeves pairing with one another (for example, with respect to FIG. 4, sleeves 408 and 412). FIG. 4 refers to bread preserver 400, however it should be understood that any appropriately shaped object can be stored in the container, for example maps, posters, plans, blueprints, pictures, etc. Additionally, a collapsible container sized for objects other than bread will have different dimensions than one sized for bread. The length may be more or less, and the depth may be more or less.

Figure 5:
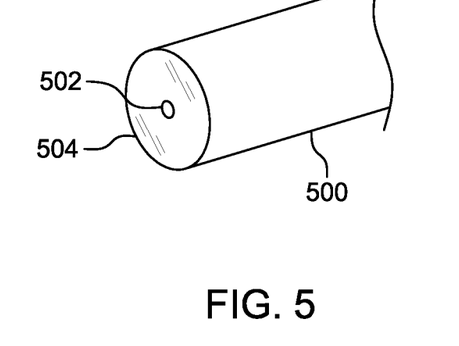
FIG. 5 is a top left perspective view illustrating a portion of a storage container with a valve.

FIG. 5 illustrates partial sleeve 500 of a bread preserver having valve 502. In one implementation valve 502 is a hole in end 504. In one implementation the hole is sized to allow air to exit a bread preserver at a reasonable rate during collapse or expansion. The hole may be sized from 1 to 10 mm, for example.

Figure 6:
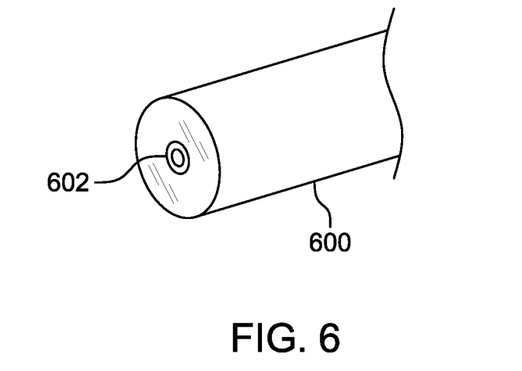
FIG. 6 is a top left perspective view illustrating a portion of a storage container with a valve.

FIG. 6 illustrates partial sleeve 600 of a bread preserver having valve 602. In one implementation valve 602 is a pressure control relief valve. In one implementation valve 602 allows air to exit a bread preserver during collapse, with the pressure in the bread preserver from the sleeves being pushed together opening valve 602. Prior to expansion of the bread preserver, a user may activate a bypass or otherwise manually open valve 602 to enable air to re-enter the bread preserver during expansion. The construction, implementation, application and use of such valves are well known by those of ordinary skill in the art.

Figure 7:
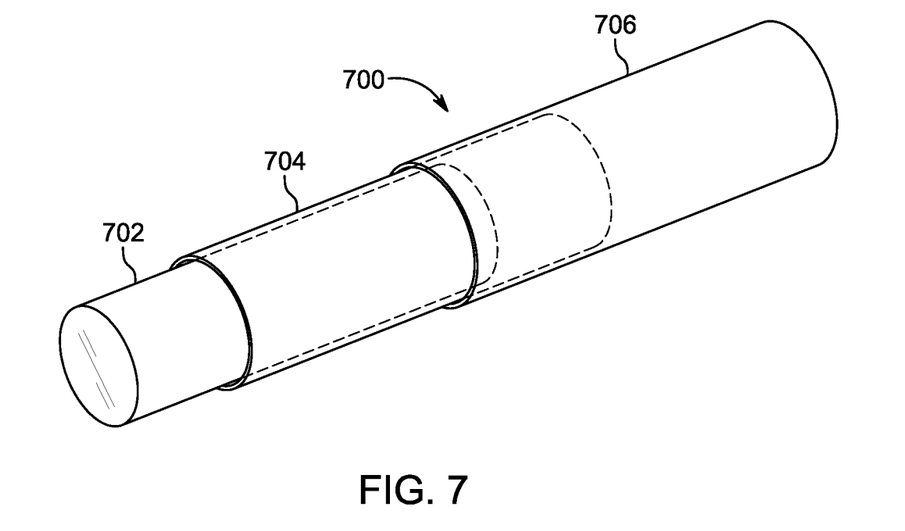
FIG. 7 is a top left perspective view illustrating a partially collapsed storage container.

FIG. 7 illustrates bread preserver 700 in a partially collapsed state. Bread preserver 700 has three sleeves. Sleeve 702 inserts into sleeve 704. Sleeve 704 inserts into sleeve 706. Sleeve 702 is more than halfway inserted into sleeve 704, as indicated by the dotted lines within sleeve 704. Sleeve 704 is inserted less than halfway into sleeve 706, as indicated by the dotted lines within sleeve 706. In one implementation sleeves 702, 704 and 706 have similar lengths. In one implementation sleeves 702, 704 and 706 have different lengths.

Figure 8:
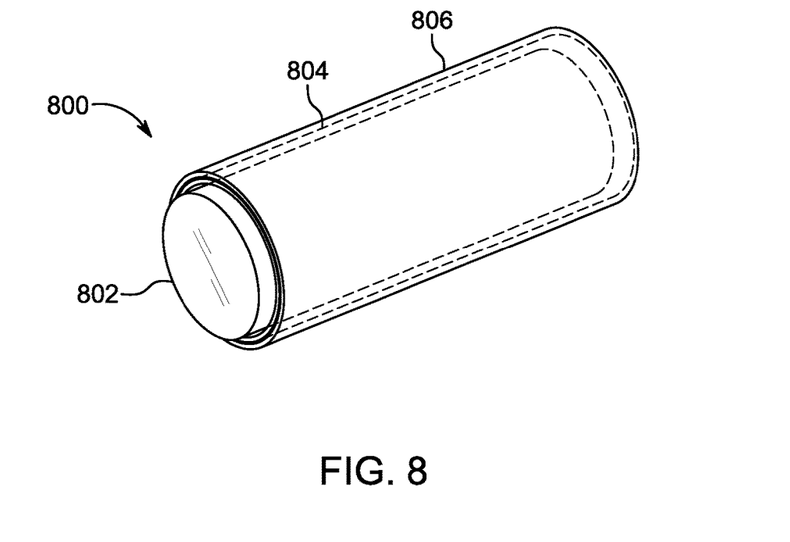
FIG. 8 is a top left perspective view illustrating a fully collapsed storage container.

FIG. 8 illustrates bread preserver 800 in a fully collapsed state. Bread preserver 800 has three sleeves. Sleeve 802 inserts into sleeve 804. Sleeve 804 inserts into sleeve 806. Sleeve 802 is fully inserted into sleeve 804, as indicated by the dotted lines within sleeve 804. Sleeve 804 is fully inserted into sleeve 806, as indicated by the dotted lines within sleeve 806. In one implementation sleeves 802, 804 and 808 have similar lengths. In one implementation sleeves 802, 804 and 806 have different lengths.

Figure 9:
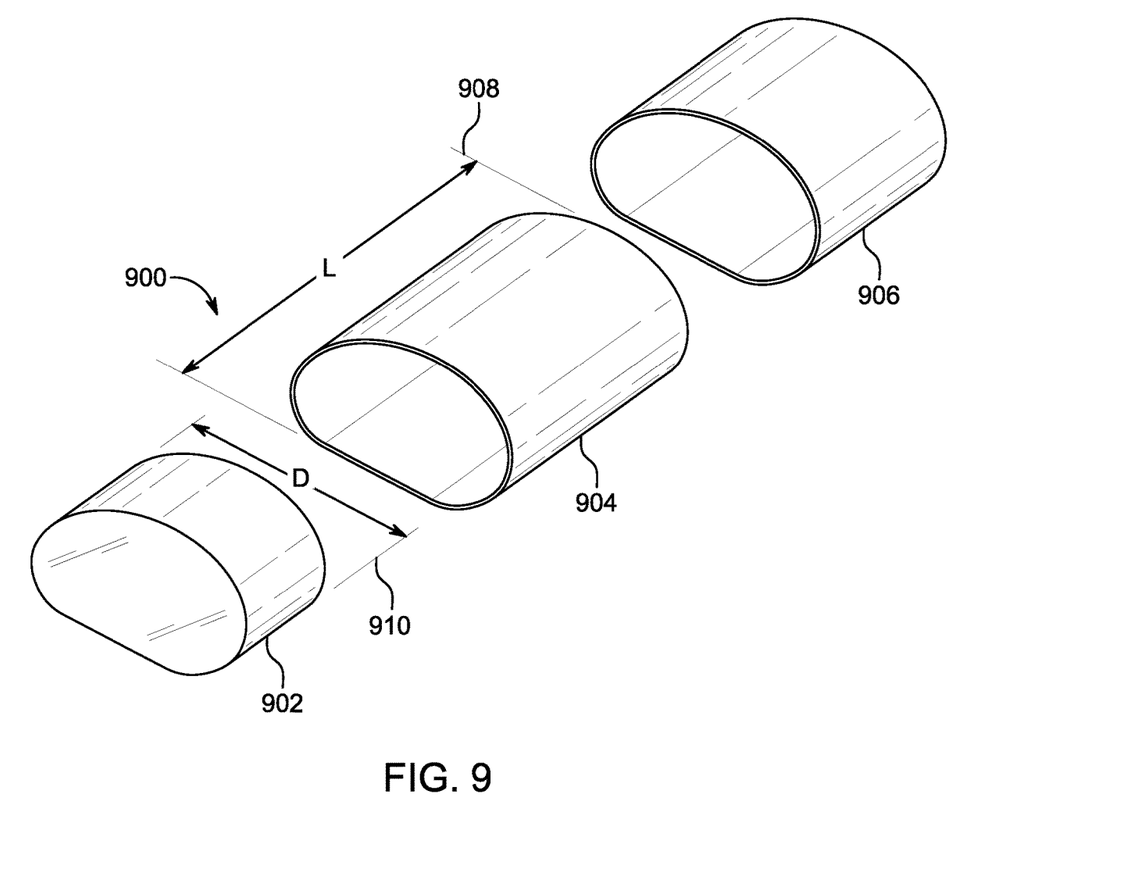
FIG. 9 is a top left perspective view illustrating a non-cylindrical storage container.

FIG. 9 illustrates non-cylindrical bread preserver 900. Bread preserver 900 has three sleeves. Similar to previous implementations in this disclosure, sleeve 902 inserts into sleeve 904. Sleeve 904 inserts into sleeve 906. Sleeves 902, 904 and 906 are a modified cylinder in cross-section. One side of bread preserver 900 is flat, with the remaining walls being round or oval in shape. In one implementation this more closely approximates the shape of a baguette, which being cooked on a flat surface will tend to have a flat edge, with rounded or oval-like walls where the bread rises away from the surface upon which it was baked. Bread preserver 900 may include implementations described in previous parts of the disclosure, including but not limited to concentric ridges, friction, gaskets, valves, etc. Although bread preserver 900 is a modified cylinder, other implementations may include oval, triangle, square, or other mixed shapes in order to accommodate particular items. Reference is made to the length and depth of sleeves generally, and FIG. 9 illustrates one way of making such measurements, with dimension 908 representing a length and dimension 910 representing a depth. In one implementation dimension 910 for depth is measured across the deepest part of a sleeve, in the case that a sleeve has a non-uniform depth. A cylindrical sleeve has a uniform depth, for example.

In one implementation a bread container comprises an elongated tubular body having a hollow interior. A first arm is coupled to the body and is configured to telescopically slide along the length of the body, the first arm having an end proximal to the body and an end distal to the body, the distal end of the first arm being closed. A second arm is coupled to the body and is configured to telescopically slide along the length of the body, the second arm having an end proximal to the body and an end distal to the body, the distal end of the second arm being closed. The first arm may be configured to be removable from the body. The bread container may have a fully extended state and a fully collapsed state, the fully extended state reached with the distal end of the first arm as far from the body as possible while maintaining a connection between the first arm and the body, and the distal end of the second arm as far from the body as possible while maintaining a connection between the second arm and the body. The fully collapsed state may be reached with the distal end of the first arm as close to the body as possible, and the distal end of the second arm as close to the body as possible. The bread container where the body, the first arm and the second arm are sized to enclose a complete baguette while in the fully extended state. The bread container may be sized to enclose one third of a baguette while in the fully collapsed state.

Although the examples provided describe a bread preserver or container having all ridges, or all threads, or all gaskets, or all friction, one of skill in the art understands that the means of joining sleeves may be mixed, for example ridges on one sleeve and threads on another sleeve, or valves on one sleeve with threads on another sleeve, or friction on one sleeve with a gasket on another sleeve, and so on.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A food preserver comprising:
   a first sleeve having a wall, a first end and a second end, the wall of the first sleeve enclosing a space within the first sleeve and having a length greater than its depth, the first and second ends of the first sleeve open to enable free access to the space within the first sleeve;

a second sleeve having a wall, a first end and a second end, the wall of the second sleeve enclosing a space within the second sleeve and having a length greater than its depth, the first end of the second sleeve open to enable free access to the space within the second sleeve, the second end of the second sleeve closed to inhibit access to the space within the second sleeve, the depth of the second sleeve being more than the depth of the first sleeve such that the first sleeve engagedly fits within the second sleeve; and a third sleeve having a wall, a first end and a second end, the wall of the third sleeve enclosing a space within the third sleeve and having a length greater than its depth, the first end of the third sleeve open to enable free access to the space within the third sleeve, the depth of the third sleeve being less than the depth of the second sleeve such that the third sleeve engagedly fits within the second sleeve, the third sleeve configured to fit within the second sleeve a distance greater than half the length of the second sleeve, the depth of the third sleeve being less than the depth of the first sleeve such that the third sleeve engagedly fits within the first sleeve.

2. The food preserver of claim 1 wherein the fit of the third sleeve within the second sleeve substantially inhibits the passage of air between the third sleeve and the second sleeve, the second end of the third sleeve further having a valve configured to enable the passage of air.

3. The food preserver of claim 1 wherein the length of the third sleeve is at least as long as the second sleeve.

4. The food preserver of claim 3 further comprising:
the wall of the first sleeve having concentric ridges along its surface;
the wall of the second sleeve having concentric ridges along its surface such that the concentric ridges of the wall of the second sleeve are configured to engage with the concentric ridges of the wall of the first sleeve when the first sleeve is within the second sleeve; and
the wall of the third sleeve having concentric ridges along its surface such that the concentric ridges of the wall of the third sleeve are configured to engage with the concentric ridges of the wall of the first sleeve when the third sleeve is within the first sleeve.

5. The food preserver of claim 3 wherein the length of the first sleeve is at least as long as the length of the second sleeve.

6. The food preserver of claim 5 wherein the length of the third sleeve is at least as long as the length of the first sleeve.

7. The food preserver of claim 3 further comprising:
the wall of the first sleeve having a thread pattern along its surface;
the wall of the second sleeve having a thread pattern along its surface such that the thread pattern of the wall of the second sleeve is configured to engage with the thread pattern of the wall of the first sleeve when the first sleeve is within the second sleeve; and
the wall of the third sleeve having a thread pattern along its surface such that the thread pattern of the wall of the third sleeve is configured to engage with the thread pattern of the wall of the first sleeve when the third sleeve is within the first sleeve.

8. The food preserver of claim 4 wherein the concentric ridges of the walls for each of the first, second and third sleeves all have the same pattern.

9. The food preserver of claim 8 wherein the fit of the first sleeve within the second sleeve substantially inhibits the passage of air between the first sleeve and the second sleeve.

10. The food preserver of claim 9 wherein the fit of the third sleeve within the first sleeve substantially inhibits the passage of air between the third sleeve and the first sleeve, the second end of the third sleeve further having a valve configured to enable the passage of air.

11. The food preserver of claim 10 wherein the valve is a hole in the second end of the third sleeve.

12. The food preserver of claim 10 wherein the valve is configured to open during insertion of the third sleeve into the first sleeve and is configured to allow the passage of air during insertion.

13. The food preserver of claim 9 wherein the fit of the third sleeve within the first sleeve substantially inhibits the passage of air between the third sleeve and the first sleeve, the second end of the second sleeve further having a valve configured to enable the passage of air.

14. The food preserver of claim 3 further comprising:
a gasket at the first end of the second sleeve configured to create a seal with the wall of the first sleeve that substantially inhibits the passage of air between the first sleeve and the second sleeve; and
a gasket at the first end of the first sleeve configured to create a seal with the wall of the third sleeve that substantially inhibits the passage of air between the first sleeve and the third sleeve.

15. The food preserver of claim 14 further comprising:
a valve at the second end of the second sleeve, the valve configured to enable the passage of air.

16. The food preserver of claim 3 wherein the walls of the first, second and third sleeves are cylindrical.

17. The food preserver of claim 3 wherein the length of the first sleeve is at least 12 inches and the depth of the first sleeve is at least 2.5 inches.

* * * * *